(12) United States Patent
Imholt et al.

(10) Patent No.: US 9,388,086 B2
(45) Date of Patent: Jul. 12, 2016

(54) METHOD OF FABRICATING OPTICAL CERAMICS CONTAINING COMPOSITIONALLY TAILORED REGIONS IN THREE DIMENSION

(75) Inventors: Jiyun C. Imholt, Methuen, MA (US); Richard L. Gentilman, Acton, MA (US); Thomas M. Hartnett, Nashua, NH (US)

(73) Assignee: RAYTHEON COMPANY, Waltham, MA (US)

( * ) Notice: Subject to any disclaimer, the term of this patent is extended or adjusted under 35 U.S.C. 154(b) by 690 days.

(21) Appl. No.: 13/040,555

(22) Filed: Mar. 4, 2011

(65) Prior Publication Data

US 2012/0225767 A1   Sep. 6, 2012

(51) Int. Cl.
*C04B 35/00* (2006.01)
*G02B 1/00* (2006.01)
*B29D 11/00* (2006.01)
(Continued)

(52) U.S. Cl.
CPC ............ *C04B 35/6455* (2013.01); *B29D 11/00* (2013.01); *C04B 35/115* (2013.01); *C04B 35/44* (2013.01); *C04B 35/505* (2013.01); *C04B 35/553* (2013.01); *G02B 1/02* (2013.01); *C04B 2235/3203* (2013.01); *C04B 2235/3213* (2013.01); *C04B 2235/3224* (2013.01); *C04B 2235/3225* (2013.01); *C04B 2235/3232* (2013.01); *C04B 2235/3241* (2013.01);
(Continued)

(58) Field of Classification Search
CPC .. C04B 35/6455; C04B 35/115; C04B 35/44; C04B 35/505; C04B 35/553; B29D 11/00; G02B 1/02

USPC ......... 264/1.1, 1.21, 1.22, 2.7, 603, 669, 497, 264/430, 439, 440, 482
See application file for complete search history.

(56) References Cited

U.S. PATENT DOCUMENTS

| 4,221,748 A | 9/1980 | Pasco et al. ..................... 264/43 |
| 4,710,480 A | 12/1987 | Buschmann et al. ........... 501/95 |

(Continued)

FOREIGN PATENT DOCUMENTS

| EP | 1158288 A1 | 11/2001 |
| EP | 1562651 A1 | 8/2005 |
| GB | 2446386 | * 8/2008 |

OTHER PUBLICATIONS

Three Dimensional Printing; Research Programs and Publications; http://web.mit.edu/tdp/www/2.html; pp. 7, Nov. 4, 2010.

(Continued)

*Primary Examiner* — Mathieu Vargot
(74) *Attorney, Agent, or Firm* — Lando & Anastasi, LLP

(57) ABSTRACT

In accordance with the present embodiment, a method for making an optical ceramic comprises depositing a plurality of thin layers of powder. The powder comprises a first optical material powder having a first dopant level, and a second optical material powder. The first and second optical material powders are deposited for each layer based on the first dopant level and according to data associated with a three-dimensional (3D) compositional profile design of an optical ceramic. The method further comprises binding the first and second optical material powders of each thin layer to each other and each thin layer with an adjacent layer such that a green state optical ceramic is produced based on the 3D compositional profile design. The method further comprises densifying the green state optical ceramic to obtain the optical ceramic.

17 Claims, 3 Drawing Sheets

(51) Int. Cl.
   *C04B 35/645* (2006.01)
   *C04B 35/115* (2006.01)
   *C04B 35/44* (2006.01)
   *C04B 35/505* (2006.01)
   *C04B 35/553* (2006.01)
   *G02B 1/02* (2006.01)

(52) U.S. Cl.
   CPC ..... *C04B2235/6026* (2013.01); *C04B 2235/75* (2013.01); *C04B 2235/762* (2013.01)

(56) References Cited

U.S. PATENT DOCUMENTS

| | | | |
|---|---|---|---|
| 4,921,731 A | 5/1990 | Clark et al. | 427/314 |
| 5,254,397 A | 10/1993 | Kawai et al. | 428/245 |
| 5,294,477 A | 3/1994 | Kanba et al. | 428/212 |
| 5,354,398 A | 10/1994 | Kawai | 156/89 |
| 5,455,000 A | 10/1995 | Seyferth et al. | 419/36 |
| 5,525,374 A | 6/1996 | Ritland et al. | 427/376.1 |
| 5,554,929 A | 9/1996 | Doty et al. | 324/318 |
| 5,567,051 A | 10/1996 | Annati et al. | 374/57 |
| 5,834,070 A | 11/1998 | Movchan et al. | 427/566 |
| 5,886,548 A | 3/1999 | Doty et al. | 324/318 |
| 6,037,066 A | 3/2000 | Kuwabara | 428/610 |
| 6,066,285 A * | 5/2000 | Kumar | 264/439 |
| 6,124,635 A | 9/2000 | Kuwabara | 257/703 |
| 6,136,452 A | 10/2000 | Munir et al. | |
| 6,225,246 B1 | 5/2001 | Darcovich | 501/80 |
| 6,248,290 B1 | 6/2001 | Kuwabara | 419/6 |
| 6,322,897 B1 | 11/2001 | Borchert et al. | 428/469 |
| 6,446,700 B1 | 9/2002 | Klug | 164/126 |
| 6,461,564 B1 | 10/2002 | Dilmore et al. | 419/38 |
| 6,780,368 B2 * | 8/2004 | Liu et al. | 264/401 |
| 7,063,886 B2 | 6/2006 | Thebault et al. | 428/304.4 |
| 7,223,356 B2 | 5/2007 | Chartier et al. | 252/500 |
| 7,560,139 B2 | 7/2009 | Thebault et al. | 427/248.1 |
| 7,597,838 B2 | 10/2009 | Subramanian et al. | 264/640 |

OTHER PUBLICATIONS

Kamimura et al.; "Ceramic YAG Composite With Nd Grdient Structure for Homogeneous Absorption of Pump Power"; CThT6; Optical Society of America; pp. 2, 2007.

* cited by examiner

US 9,388,086 B2

METHOD OF FABRICATING OPTICAL CERAMICS CONTAINING COMPOSITIONALLY TAILORED REGIONS IN THREE DIMENSION

FEDERALLY SPONSORED RESEARCH

The invention was made with U.S. government support under a contract awarded by an agency of the U.S. government under Contract No. FA9451-10-D-0246 awarded by the U.S. Air Force. The U.S. government has certain rights in this invention.

FIELD OF THE DISCLOSURE

The present disclosure relates, in some embodiments, to methods for making optical ceramics (e.g., solid state laser gain media) using material or micro-material deposition methods. The disclosure also relates to compositions comprising optical ceramics having three dimensionally tailored compositional profiles (e.g., compositional gradient profiles and/or compositional segmented profiles).

BACKGROUND OF THE DISCLOSURE

Optical components have a wide variety of applications and may be used in various laser systems, in medical imaging devices, in gradient index (GRIN) optics, scintillators, and other optical devices. These applications depend on the ability of an optical component to transmit and emit light which relies in part on the microstructure and composition of the optical component. However, methods used to manufacture optical components are limited in their ability to control the 3D composition and/or microstructure of an optical component. Optical components may generally comprise optical ceramics that are polycrystalline materials with many grains or optical crystals.

For example, methods of manufacture of optical ceramics generally comprise isopressing powders to obtain a green body, followed by densification to achieve a highly transparent optical ceramic. Methods of manufacture of optical crystals may include crystal growth methods to form optical crystals followed by doping. Some methods have attempted to use modified crystal growth techniques to obtain axial gradients of dopants in optical crystals. Other methods have joined different ceramic segments to obtain segmented optical ceramics. Yet other methods have used diffusion bonding to obtain segmented gradients of dopants in optical ceramics. Still other methods have used co-sintering to obtain step-wise or segmented gradients of dopants in optical ceramics. However, none of these methods have the ability to obtain desired smoothly varying compositional profiles varying spatially in all the 3D.

SUMMARY

Accordingly, a need has arisen for improved methods for manufacturing optical ceramics.

The present disclosure relates, according to some embodiments, to methods for making optical ceramics having a compositional profile comprising respective compositions, respective concentrations, and respective configurations of doping gradient in all three spatial dimensions based on a 3D design data.

In accordance with the present embodiment, a method for making an optical ceramic comprises depositing a plurality of thin layers of powder. The powder comprises a first optical material powder having a first dopant level, and a second optical material powder. The first and second optical material powders are deposited for each layer based on the first dopant level and according to data associated with a three-dimensional (3D) compositional profile design of an optical ceramic. The method further comprises binding the first and second optical material powders of each thin layer to each other and each thin layer with an adjacent layer such that a green state optical ceramic is produced based on the 3D compositional profile design. The method further comprises densifying the green state optical ceramic to obtain the optical ceramic.

The disclosure also relates to devices and systems, comprising the present optical ceramic compositions. Optical ceramics of the disclosure may be used as laser gain media, gradient index optics (GRINs), and other optical devices. Accordingly, the disclosure provides laser systems comprising laser gain media having a compositional profile based on a 3D design data.

Some embodiments of the disclosure may provide one or more of the following technical advantages. A technical advantage of some embodiments may include the ability to make an optical ceramic having a desired compositional profile in all the three dimensions.

A technical advantage of some embodiments may include optical ceramics having a desired dopant compositional profile.

A technical advantage of some embodiments may include an optical ceramic having a compositional profile comprising a dopant gradient. In some embodiments, an optical ceramic having a compositional profile comprising a dopant gradient may have a technical advantage that may allow reducing, substantially eliminating and/or eliminating non-uniform temperatures within the optical ceramic. In some embodiments, an optical ceramic having a compositional profile comprising a dopant gradient may have a technical advantage that may allow uniform absorption of pump light. In some embodiments, an optical ceramic having a compositional profile comprising a dopant gradient may have a technical advantage that may allow uniform pump power distribution.

A technical advantage of an optical ceramic of the disclosure may include reducing beam distortion. A technical advantage of an optical ceramic of the disclosure may include reducing, minimizing or substantially eliminating thermal lensing. A technical advantage of an optical ceramic of the disclosure may include increased resistance to thermal stress fracture.

A technical advantage of methods of the disclosure to make an optical ceramic may include a higher manufacturing yield. A technical advantage of methods of the disclosure to make an optical ceramic may include reducing manufacturing costs.

Further technical advantages of particular embodiments of the present disclosure may include overall device/system performance derived from better thermal management and/or compact integrated designs.

Various embodiments of the disclosure may include none, some, or all of the above technical advantages. One or more other technical advantages may be readily apparent to one skilled in the art from the figures, descriptions, and claims included herein.

This summary contains only a limited number of examples of various embodiments and features of the present disclosure. For a better understanding of the disclosure and its advantages, reference may be made to the description of exemplary embodiments that follows.

BRIEF DESCRIPTION OF THE DRAWINGS

Some embodiments of the disclosure may be understood by referring, in part, to the present disclosure and the accompanying drawings, wherein.

DETAILED DESCRIPTION

Figure 1:
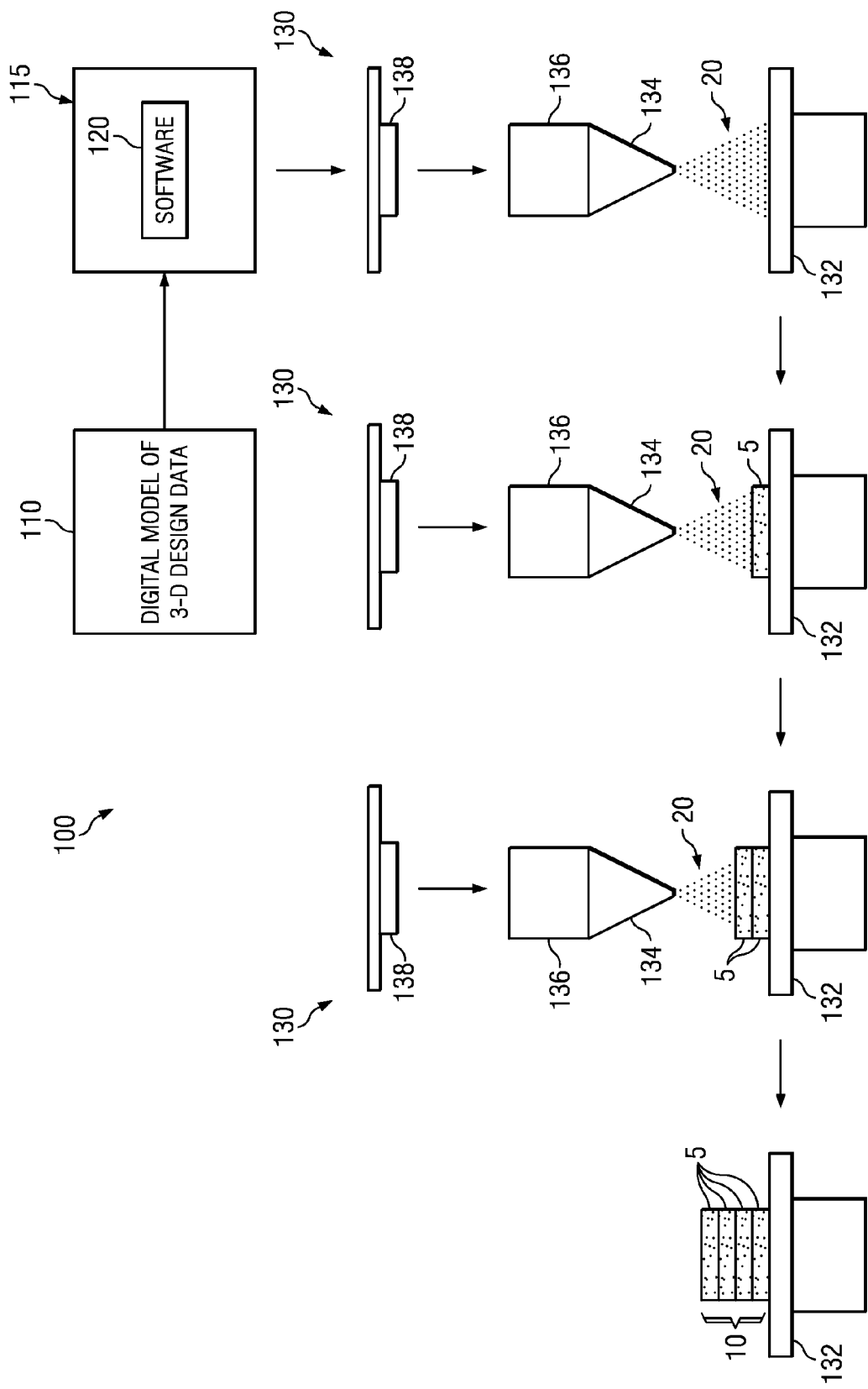
FIG. 1 illustrates the use of 3D printing in methods of the disclosure, according to a specific example embodiment of the disclosure.

It should be understood at the outset that, although example implementations of embodiments of the disclosure are illustrated below, embodiments of the present disclosure may be implemented using any number of techniques, whether currently known or not. The present disclosure should in no way be limited to the example implementations, drawings, and techniques illustrated below. Some embodiments of the disclosure and associated advantages may be best understood by reference to FIGS. 1-4 wherein like numbers refer to same and like parts.

The present disclosure relates, in some embodiments, to methods for making optical ceramics by depositing thin layers of powder and binding the powder and layers to each other. The depositing of the powder may be done using micro-deposition techniques (e.g., electrostatic deposition or electro-photographic deposition techniques). In some instances, a 3D printer may perform one or more of these methods to accomplish the depositing and binding. In some embodiments, optical ceramics made according to methods of the present disclosure may comprise compositional profiles tailored in all three dimensions.

Optical ceramics comprise transparent polycrystalline materials having crystallites (also referred to as grains), separated from one another by areas of relative disorder known as grain boundaries. The microstructure of an optical ceramic typically comprises grains of various shapes and sizes, as well as porosity and/or secondary phases. Physical and optical properties of an optical ceramic depend on its microstructure. For example, light scattering in a non-cubic (non-isotropic) polycrystalline material may be related to refractive index discontinuities due to microstructure and interface of crystallites. In order to enable maximum light output, the emission spectra and the absorption spectra of an optical ceramic material are generally well separated. Accordingly, an optical ceramic material may be transparent at its emission wavelength.

Since optical properties and physical properties of an optical ceramic material depend on its composition and microstructure, methods of the present disclosure are designed to fabricate optical ceramics with a desired three-dimensional (3D) compositional profile. In some embodiments, methods of the present disclosure may be used to fabricate optical ceramics wherein components of optical ceramic materials may be designed to have compositional profiles in 3D at resolutions of a certain number of dots per inch (dpi). In some embodiments, the methods of the present disclosure may further comprise forming a 3D microstructure of the optical ceramic to provide optical ceramics with superior properties.

Methods of the present disclosure relate to making optical ceramics having a composition profile that is tailored three-dimensionally using a deposition and binding method to bind thin layers of two or more optical material powders having different levels of dopants to each other. Micro-deposition techniques may be used to deposit and bind the layers of powder. The powder may be deposited according to 3D design data associated with an optical ceramic designed to have desired compositional profiles yielding desired optical ceramic properties.

According to teachings of the present disclosure, a compositional profile of an optical ceramic may be designed. A compositional profile may be designed to match or mitigate the thermal profile of a gain medium. A compositional profile of an optical ceramic may include respective compositions, respective configurations and respective dimensions of each component of an optical ceramic. A respective composition may comprise, but is not limited to, the material of each component comprised in an optical ceramic (e.g., one or more optical materials, one or more dopants, binder material etc.), quantities of each material component, concentrations of each material component, or a combination thereof. A respective configuration may comprise, but is not limited to, a 3D or a spatial location of each material component of an optical ceramic, a certain concentration of a material component at a certain spatial location, or a combination thereof. A respective dimension may include, but is not limited to, the size and shape of the final end product optical ceramic, a 3D shape of the optical ceramic and spatial location of its components with regard to the 3D shape.

In some embodiments, designing a compositional profile of an optical ceramic may include assigning compositional details of an optical ceramic, such as, but not limited to, material components comprised in an optical ceramic (e.g., one or more of optical materials, dopants), quantities of each material component, concentrations of each material component); as well as spatial orientation of compositions (e.g., 3D orientation of material components; concentration of each material component with respect to its 3D location (e.g., segmented sections comprising one or more components; and/or formation of gradients of one or more components). A compositional profile of an optical ceramic may be referred to in the present application variously as design data, 3D design data and/or as a 3D compositional profile design data of an optical ceramic.

Following designing of a 3D compositional profile design data, a digital representation of the compositional profile may be created as a 3D object and stored in a computer memory. Such a 3D object may be referred to herein variously as a 3D digital representation or a digital model of the optical ceramic. Computer software may be used to make sections of the 3D digital representation into a plurality of distinct layers.

Micro-deposition techniques (e.g., electrostatic deposition or electro-photographic deposition) may then be used to deposit optical powder to fabricate each distinct layer of material as sectioned by the software. Several distinct layers may be fabricated over one another, according to the digital 3D design data, to fabricate a desired optical ceramic. Accordingly, an optical ceramic that corresponds to a 3D digital representation of its corresponding 3D compositional profile design data may be made according to the present disclosure. In some embodiments, a 3D printer may be configured to deposit the optical powder into the plurality of layers according to the 3D compositional profile design of the optical ceramic to create the 3D ceramic.

FIG. 1 illustrates a system 100 configured to create an optical ceramic 10 having a desired compositional profile, according to embodiments of the present disclosure. System 100 may include a 3D digital model 110 of optical ceramic 10. Digital model 110 may include the desired compositional profile (not expressly depicted) of optical ceramic 10. System 100 may also include a computer 115 that includes software 120. Software 120 may be configured to divide digital model 110 into digital layers (not expressly shown) that may represent sections 5 of optical ceramic 10. Each digital layer may also include the desired compositional profile of the section 5 associated with that layer. Accordingly, each section 5 may be created to have a compositional profile of its respective digital layer such that ceramic 10 also has the overall desired compositional profile of digital model 110.

System 100 may also include 3D printing equipment 130 that may comprise a build surface or build platform 132, at least one print head 134, one or more supply chambers 136, and electronic components 138. Although specific 3D printing equipment is depicted, it is for illustrative purposes only and the present disclosure should not be limited to such. Any other suitable system, apparatus or device that may perform one or more of the operations described may also be used. Additionally, although a specific number of components are listed, the present disclosure should not be limited to such either. A system having more or fewer components than that depicted may also fall within the scope of the present disclosure.

A supply chamber 136 may comprise any suitable system, apparatus or device configured to hold a powder 20. A print head 134 may comprise any suitable system, apparatus, or device configured to deposit powder 20 from supply chamber 136 onto build surface 132. Powder 20 may comprise a binder material, an optical material powder, or any combination thereof. In some embodiments powders 20 may be nanopowders. The optical material powder and binder material are described in more detail below. In some embodiments, system 100 may include a plurality of supply chambers 136 that each hold a different powder 20.

Electronic components 138 may be operable to translate digital models 110 of 3D design data and the software generated digital layers thereof (not expressly depicted) to print head 134. Print head 134 may be further operable to deposit one or more powders 20 onto build surface 132 in a plurality of thin layers to form larger layer formations 5 that correspond to the software generated sections (not expressly depicted) of digital representation 110. Several distinct layers 5 may be fabricated over one another to form a desired optical ceramic having a desired digital 3D design data to form optical ceramic 10.

Electronic components 138 may be further operable to move print head 134 to deposit one or more powders 20 onto build surface 132 at specific spatial locations based on the corresponding design data. Print head 134 and the supply chamber 136 may be movable. In some embodiments, build surface 132 may also be movable.

System 100 may be used in methods of the disclosure to form optical ceramic 10 having a compositional profile that is three-dimensionally tailored. 3D printing equipment 100 may be used to deposit relatively thin layers of a plurality of powders 20 in dimensions and configurations corresponding with associated compositional profile design data for a desired optical ceramic 10. In some embodiments, based on the compositional profile design data, a powder 20 comprising a first optical material powder having a first dopant level may be transferred from a powder supply chamber 136 via print head 134 onto build surface 132 in a thin layer. Additionally, another powder 20 comprising a second optical material powder having a second dopant level, may be transferred from another powder supply chamber 136 via print head 134 onto build surface 132 in the thin layer. Accordingly, a thin layer of powders 20 comprising a first optical material powder and a second optical material powder may be deposited. The powders 20 may be deposited according to the designed compositional profile of that layer, the optical materials of the first and second optical material powders and the first and second dopant levels, or any combination thereof. The first and second dopant levels may correspond with the first or second optical material powders having a certain concentration of dopant including no dopant, or a negligible amount of dopant.

A layer of powders 20 may correspond to a digital layer of digital model 110 as sectioned by computer software 120. Multiple layers of powders 20 may be similarly deposited for each digital layer, as described above, such that sections 5 of optical ceramic 10 may be created according to the compositional profile. After all multiple sections 5 of optical ceramic 10, as sectioned by software 120, are built using powder 20, unbound powder 20 may be removed to yield optical ceramic 10 that is compositionally tailored in 3D based on digital model 110.

In some embodiments, optical material powders comprising binder material powder may be deposited in layers corresponding to a 3D design data of optical ceramic 10. In other embodiments, the optical material powder and binder material powder may be deposited separately in layers corresponding to a 3D design data of optical ceramic 10. Additionally, each optical material powder may be deposited individually, or with one or more other optical material powders for each layer.

3D printing equipment 130 available from Stratasys 3D systems, may be operable to deposit relatively thin layers of powders 20 in compositions, dimensions and configurations corresponding with associated 3D design data and then apply a binder 30 to each thin layer of powders 20. However, teachings recognize that the present methods are not limited to the 3D printing equipment 130 as described here or shown in FIG. 1 and other 3D printing apparatus and other 3D printing methods may also be used.

A wide variety of optical material powders and binders may be used with 3D printers to form various complex three dimensional products. Typically optical material powders may comprise an optical material having a dopant level. In some embodiments, the optical material powder may have a dopant level that is approximately equal to zero such that the optical material powder does not include a dopant. In other embodiments, the optical material powder may have a dopant level greater than zero such that the optical material powder includes a dopant. Further details regarding optical materials and binders are provided in sections below.

Figure 2:
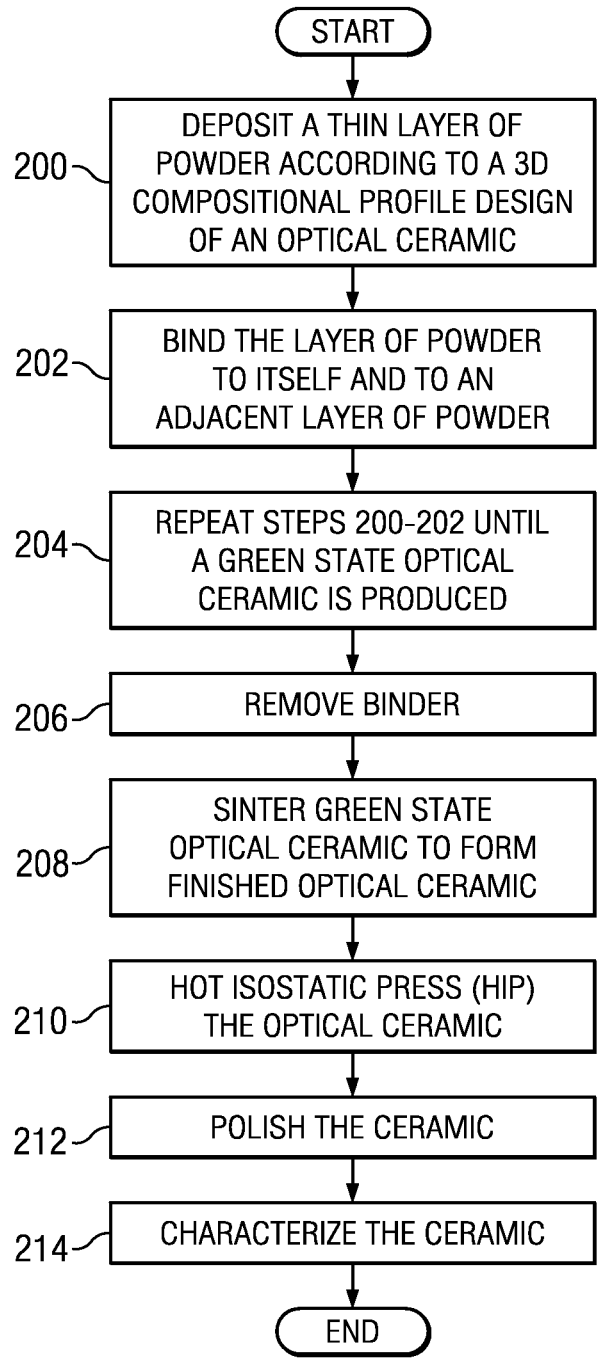
FIG. 2 illustrates an example method to make an optical ceramic using 3D printing, according to a specific example embodiment of the disclosure.

FIG. 2 illustrates an example method to make an optical ceramic 10 according to the present disclosure and in some embodiments may comprise steps 200-208. In some embodiments, the method of FIG. 2 may be used to make an optical ceramic that comprises a laser gain medium. An example method may begin at step 200 and comprise depositing a thin layer of powder. The powder may comprise a powder 20 that includes a first optical material powder of an optical material 40 (depicted in FIG. 4). The first optical material powder may have a first dopant level associated with a dopant 50 (depicted in FIG. 4). The powder may also comprise another powder 20 that includes a second optical material powder having a second dopant level. The second optical material powder may be associated with the same optical material 40 as the first optical material powder or may be associated with a different optical material 40. Additionally, the second dopant level may be associated with the same dopant 50 as the first dopant level, or may be associated with a different dopant 50. The powder deposited in step 200 may also comprise an additional powder 20 that includes a binder material powder.

Step 200 may further comprise depositing the powders 20 according to the optical materials 40 of the first and second optical material powders, the dopants 50 associated with the first and second dopant levels, the first and second dopant levels, and the 3D compositional profile design data. Accordingly, the thin layer of powder may have compositions, configurations and dimensions based on a 3D compositional profile design data of optical ceramic 10.

The powders 20 for each thin layer of powder may be deposited individually or in combination with one or more other powders 20 without departing from the scope of the present disclosure. In some embodiments, a 3D printer 130 may perform the depositing in step 200. Accordingly, the remainder of the method of FIG. 2 may be described with respect to 3D printer 130, where applicable, but the present disclosure should not be limited to such. Any suitable system, apparatus or device may be used to perform one or more of the steps of the method described in FIG. 2.

As mentioned above, 3D printer 130 may be used to deposit various types of powders 20, including optical material powder having a dopant level and binder material powders. Optical materials used to make optical material powder may comprise a glass material, a crystalline material, a plastic material or any combinations thereof.

Non limiting examples of crystalline material that may be used as powder 20 may include YAG (yttrium aluminum garnet), YLF (yttrium lithium fluoride), sapphire (aluminum oxide), LiSAF (lithium strontium aluminum fluoride), yttrium oxide, other cubic oxides, and combinations thereof. Non limiting examples of glass material that may be used as powder 20 may include silica.

In some embodiments, dopant material may be added to optical material powder to create the dopant level of the optical material powder. The dopant material may comprise a rare earth element. Some non-limiting examples of dopant material may include chromium, neodymium, erbium, ytterbium and titanium ions, or any combination thereof.

Step 202 may comprise binding the powders 20 of the thin layer of powder with each other and also binding the layer with adjacent powder layers. In some embodiments, the binding of step 202 may be done after an individual layer of powder is deposited in step 200. In other embodiments, a plurality of layers may be deposited in step 200 before binding is done in step 202. Binding of each layer may be accomplished by curing or fusing the binder to consolidate each layer. The curing or fusing may be accomplished by heating each layer using a heat source such as a laser, a heat lamp, or any other suitable device.

Various types of binders may be used to bond or bind the powders 20 with each other and with adjacent powder layers. Binder materials may include, any suitable binder material (e.g., thermoplastic polymers that may decompose or burn off during a sintering process, as described in further detail below) satisfactory for binding the powders 20 to each other and the layers to adjacent layers. Binder materials may be selected based on their compatibility with the optical powder material, the solvent that may be used when incorporating the binder with the powder, and/or the type of source used to fuse the binder (e.g., laser, heat lamp, etc.). Step 204 may comprise repeating the depositing of thin layers of powder of Steps 200 and binding in Step 202 for each layer to produce a green state optical ceramic having compositions, configurations and dimensions based on the 3D compositional profile design data of optical ceramic 10.

The green state optical ceramic may be subject to densification to form a finished optical ceramic 10. Densification renders a green state optical ceramic to its denser and stronger finished state. Densification, in some non-limiting embodiments, may reduce porosity of a green state ceramic thereby making it more dense. Physical properties (such as mechanical strength, electrical properties, etc.) and optical properties (such as transmissive properties, absorptive properties, etc.) may benefit from a high relative density densification may be used to make optical ceramic 10. Densification may comprise steps such as removing the binder, sintering, hot pressing, hot isostatic pressing, or any combinations thereof.

Accordingly, in one embodiment, the method may comprise step 206 comprising removing the binder. In some embodiments, the binder may be removed by heating the green state optical ceramic to substantially burnout or vaporize the binder. In such embodiments, the temperatures used for removing the binder may be approximately between 200 and 600 degrees Celsius. Any suitable furnace or oven may be used to heat the green state optical ceramic. In other embodiments, the binder may be removed through solvent extraction. Removing the binder may be advantageous because binder residues may interfere with the process of eliminating porosity during densification, which may result in trapping undesired impurities in the optical ceramic.

After removing the binder in step 206, a method of the disclosure may also comprise a step 208 that comprises sintering the green state optical ceramic. Sintering may be done to remove porosity in the material and to transition the green state optical ceramic into a transparent optical ceramic. In some embodiments, sintering may comprise heating the material to approximately between 1,000 degrees Celsius and 2,000 degrees Celsius, depending on the materials. Sintering may be accomplished using a vacuum furnace, a high temperature furnace, a high temperature controlled atmospheric furnace (e.g., pure oxygen, helium, helium oxygen gas mixtures), a hot press, or a hot isostatic press or any other suitable solid state sintering method. In some embodiments, the same furnace used for removing the binder may be used for sintering.

During sintering, the powders that are used to manufacture the green state optical ceramic may be compacted and transformed to a strong, dense ceramic body upon heating. Sintering may reduce porosity within a green state ceramic and enhance properties such as strength, translucency, thermal conductivity and optical properties. During the firing process of sintering the particles diffuse together forming larger grains such that the porosity may be substantially eliminated.

Accordingly, the grain size of the particles may become larger than the starting grain size. Sintering may result in full densification of a green state optical ceramic to form a finished optical ceramic 10. In some embodiments, sintering performed in step 208 and hot isostatic pressing (HIP) (described in further detail below) may be combined in sequence to form a finished optical ceramic.

The properties of an optical ceramic are related to its light scattering mechanism which in turn is related to its structure and composition. For example, light scattering in a polycrystalline material may be related to refractive index discontinuities in 1) microstructure (e.g., composition, non-homogenous compositions, randomly oriented grains, grain-boundaries, residual pores and/or secondary phases) and/or pores, and 2) at the interface of birefringent crystallites.

Refractive index discontinuities in polycrystalline materials may be reduced by one or more of the following: reducing or eliminating porosity, reducing or eliminating formation of secondary phases, controlling grain size in non-cubic optical materials to less than approximately one tenth to one twentieth of the optical wavelength for which the ceramic is manufactured. Some of these effects may be reduced during sintering of an optical ceramic during its manufacture.

In some embodiments, a method according to the disclosure for making an optical ceramic may further comprise step 210 comprising hot isostatic pressing (HIP). HIP may be used to reduce or eliminate any residual porosity that may remain in the optical ceramic following sintering. Thus, HIP may assist in making the optical ceramic more transparent. In some embodiments, step 210 may comprise subjecting the sintered optical ceramic to both elevated temperature and an isostatic gas pressure in a high pressure containment vessel. Accordingly, equal amounts of pressure (isostatic) may be applied to the optical ceramic from all directions. A pressurizing inert gas (such as but not limited to argon) may be used. HIP may comprise heating the containment vessel and simultaneously increasing pressure inside the vessel. In some embodiments, a gas pumping system may be used to achieve pressure level.

HIP may reduce porosity and influence the density of a ceramic material. HIP may improve mechanical properties of an optical ceramic.

In some embodiments, a method as shown in FIG. 2 may further comprise step 212 comprising polishing the optical ceramic. In some embodiments, the polishing may be accomplished through mechanical polishing using polishing compounds such as alumina or silicon carbide In some embodiments, a method as depicted in FIG. 2 may additionally comprise step 214 wherein the optical ceramic is characterized. Optical characterization may include measurement of optical transmission, optical absorption and total integrated scatter. Following step 214, the method may end.

In non-limiting examples, a method according to FIG. 2 may be used to make optical ceramic such as a solid-state laser (SSL) gain medium, transparent scintillator ceramics, scintillator optical ceramics, transparent optical ceramics, translucent optical ceramics, cubic polycrystalline materials, non-cubic polycrystalline materials, GRIN optics, etc.

A method according to FIG. 2 may be used to make optical ceramics such as but not limited to: a Nd:YAG, a Cr:YAG, a Ti:sapphire, a Yb:YAG, a Tm:YAG, a Ho:YAG, a Er:YAG, Ho, a Tm:YAG, a Cr:sapphire, Cr:LiSAF (chromium-doped lithium strontium aluminum fluoride), a Er:YLF, a Nd:glass, a Er:glass, $(Y,Gd)_2O_3$:Eu, $Gd_3Ga_5O_{12}$:Cr,Ce, Ce doped YAG; $Lu_2O_3$:Eu, or combinations thereof.

Modifications, additions or omissions may be made to FIG. 2 without departing from the scope of the present disclosure. For example, the steps have been described in a particular order and the procedures in each step have been described in a particular order. However, the steps and procedures may be performed in a different order than described. Additionally, some steps may be added while other steps may be removed.

Combining characteristics of micro-deposition methods (e.g., electrostatic deposition, electro-photographic deposition) with 3D design data, according to the present teachings, may allow greater freedom to design optical ceramics (including laser gain media) having complex compositional configurations and dimensions as compared to more limited design options using conventional optical ceramic forming techniques. Manufacturing costs for such optical ceramics may also be reduced as compared with some conventional optical ceramic forming techniques.

Optical ceramics are typically produced by conventional ceramic fabrication methods. Conventional ceramic fabrication methods typically comprise packing powders (also referred to as compacting or isopressing) of optical materials—with or without a binder material—and dopants in a casting dye or a mold to form a shape; applying pressure to the optical ceramic powders to obtain a green-state optical ceramic; removing the binder; and sintering the green state optical ceramic to densify and form a finished optical ceramic.

While many ceramic fabrication methods have been described to produce optical ceramics, none of the existing methods have the ability to compositionally tailor an optical ceramic in all three dimensions. For example, while some of the existing methods may comprise joining discrete crystal segments of different optical ceramic materials using optical contacting or by using diffusion bonding or index matching adhesives or glass fits. While these methods may produce joint segments, with each segment having a different composition, they are unable to form optical ceramic materials having individual components such as dopants and optical materials in a desired spatial three dimensional arrangement at the particulate level. The requirement of packing powders of optical ceramic forming materials in a casting die or mold does not allow fine control of compositions in 3D as described by the present disclosure.

Some conventional ceramic manufacturing methods have used processes such as co-sintering or diffusion bonding to obtain dopant gradients or dopant segments in optical ceramics. Diffusion bonding is a solid state process that relies on atomic migration across an interface. The bond is formed during the application of temperature and pressure over a period of time. The diffusion bonding technique may be limited to producing discrete sharp interfaces between the bonded components. Therefore, as the number of bonded components increases, the complexity and cost of the diffusion bonding process substantially increase. Accordingly, diffusion bonding is an expensive, complex technique, and requires the mating faces of the two materials to have exceptionally smooth, flat, and clean surfaces prior to bonding such that the interfaces between the materials do not contribute to optical scattering or other optical performance degradation. Additionally, diffusion bonding is not an automated, high volume manufacturing process, which also contributes to its cost.

Co-sintering may comprise joining and sintering parts of green ceramics, each part having a respective composition to form a composite. Co-sintering may comprise joining or contacting ceramic green bodies or partially sintered bodies and then heat treating the joined (or contacted) parts to a higher density to form one part. In the co-sintering process, the materials may diffuse and bond at the interfaces.

Some disadvantages associated with diffusion bonding and co-sintering may include voids or cracks at the interfaces due to a thermal expansion mismatch between the two parts, differential shrinkage, poor initial contact at the interfaces, and voids and foreign materials at the interfaces. Co-sintering may also not be amenable to producing a smoothly varying composition profile or gradient due to the discrete nature of the components of the co-sintered parts. Accordingly, neither co-sintering or diffusion bonding is able to produce optical ceramics with defined 3D compositional profiles as described by the present disclosure.

In some embodiments, the present methods do not comprise diffusion bonding. In some embodiments, the present methods do not comprise co-sintering.

Other conventional optical material manufacture methods may comprise crystal growth methods. In methods where fabricating a optical materials is based on crystal growth, an axial gradient of dopant is attempted by modifying crystal growth by varying dopant concentration in a molten feed used to make the crystal. The resultant material may comprise a single crystal having characteristic symmetry rather than an assembly of individual crystals joined at grained boundaries, such as in ceramics. Some disadvantages of crystal growth methods may include an inability to control the gradient in 3D due to the directional nature of the crystal growth process.

In contrast to conventional optical manufacturing methods, an aspect of the present disclosure may include depositing and binding thin layers of powder to each other using microdeposition techniques (e.g., electrostatic deposition, electrophotographic deposition, etc.) The binding may be done in combination with 3D design data to form respective portions of an optical ceramic from different materials (e.g., different combinations of one or more optical materials and/or one or more dopants; and/or different concentrations of one or more optical materials and/or one or more dopants) to have respective portions of the optical ceramic having different optical properties and/or physical properties.

Changing optical properties in respective portions of an optical ceramic may allow for higher emission/refraction/proximate a first end (e.g., bottom portion) of an optical ceramic and a relatively low emission/refraction/proximate a second end (e.g., top portion) of the optical ceramic. This may allow an optical ceramic to function as a waveguide, a beam splitter, an optical filter, etc.

In some embodiments, a method according to the disclosure may comprise making an optical ceramic having at least one compositionally varying region. In some embodiments, a method according to the disclosure may comprise making an optical ceramic having at least one compositionally varying region, wherein the concentration of at least one optical material and/or the concentration of at least one dopant material may be varied as a continuous gradient. In some embodiments, a method according to the disclosure may comprise making an optical ceramic having a compositional gradient profile wherein the dopant powder and the optical ceramic material powder are deposited in respective quantities, respective configurations and respective dimensions to form an optical ceramic gradient and a dopant gradient based on three dimensional (3D) design data to form the optical ceramic having a compositional gradient profile of the optical ceramic material and the dopant material.

In some embodiments, a method according to the disclosure may comprise making an optical ceramic having at least one compositionally varying region, wherein the concentration of the ceramic and/or the dopant material may be varied in one or more segmented sections. In some embodiments, a method according to the disclosure may comprise making an optical ceramic wherein the ceramic powders and the dopant powders are deposited in layers in respective quantities, respective configurations and respective dimensions to form segmented regions differing in composition in the optical ceramic.

Figure 3A:
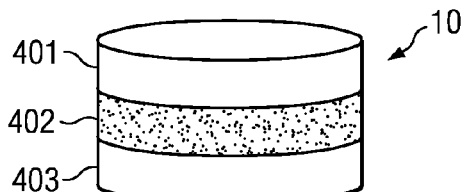
FIG. 3A illustrates an example optical ceramic showing a compositional segmented profile according to a specific example embodiment of the disclosure.
Figure 3B:
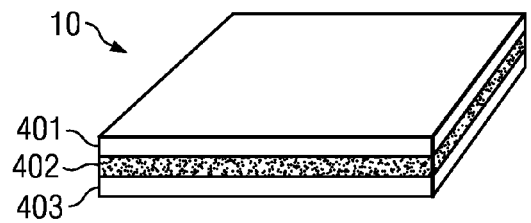
FIG. 3B illustrates an example optical ceramic showing a compositional segmented profile according to a specific example embodiment of the disclosure.
Figure 3C:
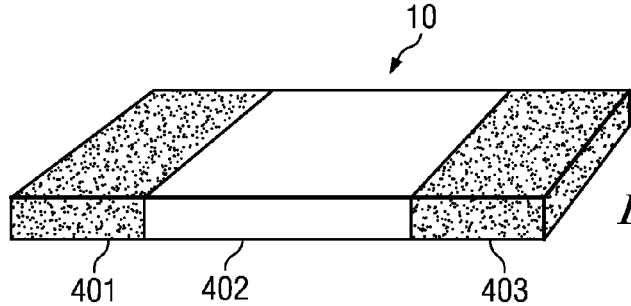
FIG. 3C illustrates an example optical ceramic showing a compositional segmented profile according to a specific example embodiment of the disclosure.

Various segmented optical ceramics may be made by methods of the present disclosure. FIGS. 3A, 3B and 3C illustrate various example optical ceramic 10s, having different shapes and dimensions and having compositional segmented profiles wherein each segment, depicted here as 401, 402 and 403, may each have different compositions and/or concentrations of optical material and/or dopant material or may have one or two segments having different compositions and/or concentrations. Teachings recognize that various numbers of multiple segment compositions and combinations thereof may be fabricated by methods of the present disclosure and that FIGS. 3A-3C are merely non-limiting representative examples.

In some embodiments, an optical ceramic such as depicted in FIG. 3A may have a cylindrical structure and may have three segments, 401, 402 and 403, wherein 401 and 403 may have substantially similar compositions and segment 402 may have a different composition sandwiched between. In some embodiments, 401 and 402 may have similar compositions with segment 403 having a different composition of optical material and/or dopant material toward the distal end (not expressly depicted). In yet other embodiments, 402 and 403 may have similar compositions with segment 401 having a different composition of optical material and/or dopant material toward the proximal end (not expressly depicted). In still other embodiments, each segment 401, 402 and 403 may each have different composition of optical material and/or dopant material (not expressly depicted).

FIG. 3B illustrates another example optical ceramic 10 having a rectangular cube shape and may have three segments 401, 402 and 403, that may each comprise different optical ceramic components as set forth above.

FIG. 3C illustrates another example optical ceramic 10 showing a compositional segmented profile wherein the first segment 401 and the third segment 403 may have a similar compositional profile, while segment 402 may have a different compositional profile. In some embodiments, 401 and 402 may have similar compositions with segment 403 having a different composition of optical material and/or dopant material toward the distal end (not expressly depicted). In yet other embodiments, 402 and 403 may have similar compositions with segment 401 having a different composition of optical material and/or dopant material toward the proximal end (not expressly depicted). In still other embodiments, each segment 401, 402 and 403 may each have different composition of optical material and/or dopant material (not expressly depicted).

Figure 4A:
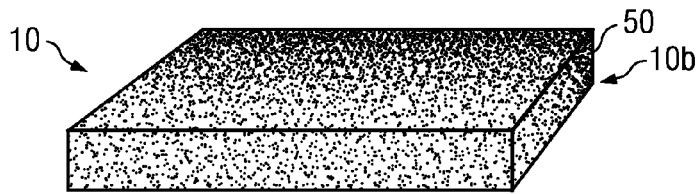
FIG. 4A illustrates an example optical ceramic showing a compositional gradient profile according to a specific example embodiment of the disclosure.
Figure 4B:
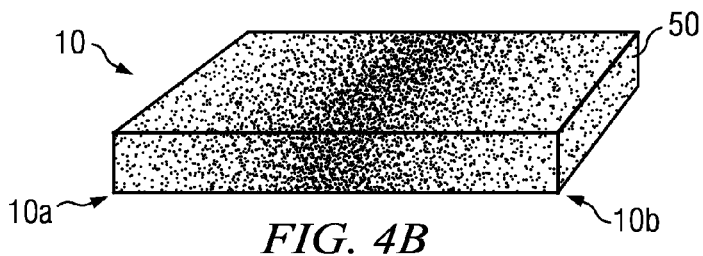
FIG. 4B illustrates an example optical ceramic showing a compositional gradient profile according to a specific example embodiment of the disclosure.
Figure 4C:
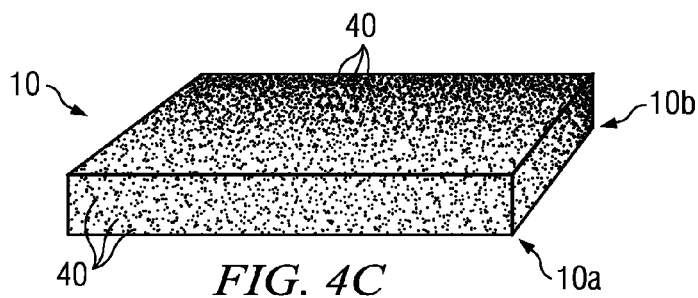
FIG. 4C illustrates an example optical ceramic showing a compositional gradient profile according to a specific example embodiment of the disclosure.

Teachings of the present disclosure describe optical ceramics having gradients of one or more components (optical material and/or dopant). Some exemplary optical ceramics of the disclosure having a gradient profile are shown in FIGS. 4A-4C. Teachings recognize that various numbers of multiple segment compositions and combinations thereof may be fabricated by methods of the present disclosure and that FIGS. 3-4 are merely non-limiting representative examples.

FIG. 4A illustrates an example optical ceramic 10 having a compositional gradient profile. As shown in the FIG. 4A, an increasing gradient of dopant 50 is seen all through a uniform composition of optical material 40, wherein concentration of dopant 50 is least at first end 10a and most at second end 10b of optical ceramic 10.

FIG. 4B illustrates an example optical ceramic 10 having another type exemplary compositional gradient profile. As shown in the FIG. 4B, a gradient of dopant 50 increases from first end 10a and second end 10b with the highest concentration of dopant 50 at center 10c, through a uniform composition of optical material 40.

FIG. 4C illustrates an increasing gradient of optical material 40 is seen all through a uniform composition of dopant 50, wherein concentration of optical material 40 is lowest at first end 10a and highest at second end 10b of optical ceramic 10.

Teachings recognize that the present disclosure provides optical ceramics having various other compositional gradient designs and that the examples depicted in FIGS. 4A-4C are merely representative non-limiting examples.

In some embodiments, an optical ceramic of the disclosure having a gradient profile may be used to mitigate excessive local heating and to achieve uniform absorption. In some embodiments, an optical ceramic of the disclosure having a gradient doping profile may be useful as a uniform pump power distribution. In some embodiments an optical ceramic of the disclosure having a gradient doping profile may advantageously reduce or eliminate large temperature differences (temperature gradients) within an optical ceramic laser slab which may otherwise lead to beam distortion, thermal lensing, and in some instances to thermal stress fracture.

Optical ceramics, made in accordance with methods of the present disclosure, may be used in a variety of applications such as but not limited to laser based applications, GRIN optics, non-kinetic directed energy weapon, medical imaging and computed tomography applications.

In some embodiments, optical ceramic compositions generated by methods of the present disclosure may be used in laser systems. A laser system typically comprises three parts: an energy source (referred to as a pump or a pump source); a laser gain media; and an optical resonator. Optical ceramics of the present disclosure may be used to form laser gain media. Accordingly, a laser system of the disclosure may comprise a laser gain media made in accordance to the present teachings.

In a laser system of the disclosure, a pump source may provide energy to a laser system and cause excitation of a laser gain media to produce emission of photons from the laser gain medium. The nature of the laser gain media may determine various laser properties, such as but not limited to the wavelength of operation. A variety of laser gain media may be used in laser systems such as liquid laser gain media, gaseous laser gain media, solid laser gain media and semiconducting laser gain media. Solid laser gain media, made in accordance with the teachings of the present disclosure, may be used to enhance currently existing laser systems. For example, application that use high power solid state lasers may use optical ceramic laser gain media made in accordance with the present disclosure that has tailored 3D compositional profile which may be designed to provide larger and higher performance laser gain media. Optical ceramic compositions made by methods of the present disclosure may increase efficiency and performance of solid state lasers. Exemplary optical ceramic based laser gain media of the disclosure may include but are not limited to Nd:YAG, Ti:sapphire, Cr:sapphire (referred to as ruby), Cr:LiSAF (chromium-doped lithium strontium aluminum fluoride), Er:YLF, Nd:glass, and Er:glass, and combinations thereof.

Optical resonators of a laser system may comprise at least two parallel mirrors placed around a laser gain medium. The mirrors may be optically coated to endow them with certain reflective properties. Typically one of the mirrors is a high reflector, and the other is a partial reflector. Light from a laser gain medium, produced by spontaneous emission of photons, may be reflected by the mirrors back into the laser gain medium, where it may be further amplified by stimulated emission. Light may reflect from the mirrors and pass through the gain medium many hundreds of times before exiting an optical resonator.

Lasers have a wide variety of applications such as but not limited to laser beams employed in welding, boring, repairing, micro-fabrication; lasers for surgical and other medical procedures; lasers in weapon systems; lasers in GRIN optic devices. Accordingly, laser gain media (optical ceramics) made in accordance with the teachings of the present disclosure may have a variety of applications and enhance the functioning of existing laser applications.

In some embodiments, optical ceramic laser gain media made in accordance to the methods of the present disclosure may reduce deterioration of positional stability and output stability of a laser beam caused by thermal fluctuations in a laser rod during laser oscillation in a laser system. In some embodiments, optical ceramic laser gain media made in accordance to the methods of the present disclosure may enhance absorption efficiency of light that excites the laser rod in a laser system. In some embodiments, optical ceramic laser gain media made in accordance to the methods of the present disclosure may improve oscillation efficiency in a laser system. In some embodiments, optical ceramic laser gain media made in accordance to the methods of the present disclosure may enhance cooling efficiency in a laser system. In some embodiments, optical ceramic laser gain media made in accordance to the methods of the present disclosure may decrease or suppress thermal lensing effects in a laser system.

As will be understood by those skilled in the art who have the benefit of the instant disclosure, other equivalent or alternative methods and compositions of optical ceramics and devices and systems comprising the optical ceramics made herein can be envisioned without departing from the description contained herein. Accordingly, the manner of carrying out the disclosure as shown and described is to be construed as illustrative only.

Persons skilled in the art may make various changes in the shape, size, number, and/or arrangement of method steps without departing from the scope of the instant disclosure. For example, various optical materials and/or dopants and concentrations thereof may be used to make an optical ceramic using micro-deposition methods as described herein. The size, shape and compositional profiles of an optical ceramic made by the present methods may be varied, scaled up or down to suit the needs and/or desires of a practitioner and the application the optical ceramic is being made for. An optical ceramic in a system or application of the disclosure may be configured and arranged to be disposable, serviceable, interchangeable, and/or replaceable. These equivalents and alternatives along with obvious changes and modifications are intended to be included within the scope of the present disclosure. Accordingly, the foregoing disclosure is intended to be illustrative, but not limiting, of the scope of the disclosure as illustrated by the following claims.

What is claimed is:

1. A method for making an optical ceramic comprising:
depositing a plurality of thin layers of powder using an electrostatic or electro-photographic deposition technique, the powder comprising a first optical material powder having a first dopant level, and a second optical material powder, wherein the first and second optical material powders comprise at least one transparent crystalline material and are deposited for each layer based on the first dopant level and according to data associated with a three-dimensional (3D) compositional segmented profile design of an optical ceramic, wherein the 3D compositional segmented profile design includes segmented regions and depositing the plurality of thin layers of powder comprises depositing the first and second optical powders in respective quantities, respective configurations, and respective dimensions to form a first segmented region having a first composition of the first optical material powder and the second optical material powder, a second segmented region disposed laterally adjacent to the first segmented region and having a second composition of the first optical material powder and the second optical material powder that is different than the first composition, and a third segmented region disposed laterally adjacent to the second segmented region and having the first composition of the first optical material powder and the second optical material powder;

binding the first and second optical material powders of each thin layer to each other and each thin layer with an adjacent layer such that a green state optical ceramic is produced based on the 3D compositional profile design; and densifying the green state optical ceramic to obtain the optical ceramic.

2. The method of claim 1, wherein densifying the green state optical ceramic comprises sintering the green state optical ceramic to form the optical ceramic.

3. The method of claim 1, wherein the powder further comprises a binder material.

4. The method of claim 3, wherein binding the first and second optical material powders and the thin layers comprises curing or fusing the binder material.

5. The method of claim 1, further comprising depositing a binder material for the plurality of thin layers, wherein binding the first and second optical material powders and the thin layers comprises curing or fusing the binder material.

6. The method of claim 1, wherein the second optical material powder has a second dopant level, further comprising depositing the first and second optical material powders based on the first and second dopant levels.

7. The method of claim 1, wherein the first and second optical material powders further comprise at least one of a glass and a plastic.

8. The method of claim 1, wherein the transparent crystalline material is selected from a group consisting of YAG (yttrium aluminum garnet), YLF (yttrium lithium fluoride), sapphire (aluminum oxide), LiSAF (lithium strontium aluminum fluoride) yttrium oxide, and combinations thereof.

9. The method of claim 7, wherein the glass material comprises silica.

10. The method of claim 1, wherein the first dopant level is associated with a dopant that comprises a rare earth element.

11. The method of claim 1, wherein the first dopant level is associated with a dopant selected from a group consisting of chromium, neodymium, erbium, thulium, yttrium and titanium ions, and combinations thereof.

12. The method of claim 6, wherein at least one segmented region includes a compositional gradient comprising a dopant gradient of a dopant material associated with at least one of the first dopant level and the second dopant level, wherein depositing the thin layers of powder comprises depositing the first and second optical material powders in respective quantities, respective configurations and respective dimensions to form the dopant gradient based on at least one of the first dopant level and the second dopant level and the 3D compositional segmented profile design data comprising the compositional gradient to form the optical ceramic having the at least one segment with a desired compositional gradient profile corresponding with at least one of the first dopant material and the second dopant material.

13. The method of claim 1, wherein at least one segmented region includes a compositional gradient comprising an optical material gradient, wherein depositing the thin layers of powder comprises depositing the first and second optical material powders in respective quantities, respective configurations and respective dimensions to form the optical material gradient based on the 3D compositional segmented profile design data comprising the compositional gradient to form the optical ceramic having the at least one segment with a compositional gradient profile corresponding with the optical ceramic material.

14. The method of claim 1, further comprising hot isostatic pressing (HIP) the optical ceramic.

15. The method of claim 1, further comprising polishing the optical ceramic.

16. A method of making a laser gain medium comprising:
depositing a plurality of thin layers of powder using an electrostatic or electro-photographic deposition technique, the powder comprising a first optical material powder having a first dopant level and a second optical material powder, wherein the first and second optical material powders comprise at least one transparent crystalline material and are deposited for each layer based on the first dopant level and according to data associated with a three-dimensional (3D) compositional segmented profile design of a laser gain medium, wherein the 3D compositional segmented profile design includes segmented regions and depositing the plurality of thin layers of powder comprises depositing the first and second optical powders in respective quantities, respective configurations, and respective dimensions to form a first segmented region having a first composition of the first optical material powder and the second optical material powder, a second segmented region disposed laterally adjacent to the first segmented region and having a second composition of the first optical material powder and the second optical material powder that is different than the first composition, and a third segmented region disposed laterally adjacent to the second segmented region and having the first composition of the first optical material powder and the second optical material powder;

binding the first and second optical material powders of each thin layer to each other and each thin layer with an adjacent layer such that a green state laser gain medium is produced based on the 3D compositional profile design; and densifying the green state laser gain medium to obtain a laser gain medium.

17. The method of claim 16, wherein the laser gain medium comprises at least one of Nd:YAG (yttrium aluminum garnet), Cr:YAG, Ti:sapphire (aluminum oxide), Yb:YAG, Tm:YAG, Ho:YAG, Er:YAG, Ho, Tm:YAG, Cr:sapphire, Cr:LiSAF (chromium-doped lithium strontium aluminum fluoride), and Er:YLF.

* * * * *